R. C. McGEE.
CAKE CUTTING MACHINE.
APPLICATION FILED JAN. 16, 1918.

1,357,241.

Patented Nov. 2, 1920.
4 SHEETS—SHEET 1.

Witnesses:
E. J. Geske
W. Thornton Bogert

Inventor:
Robert C. McGee
By Walter Murray
Attorney.

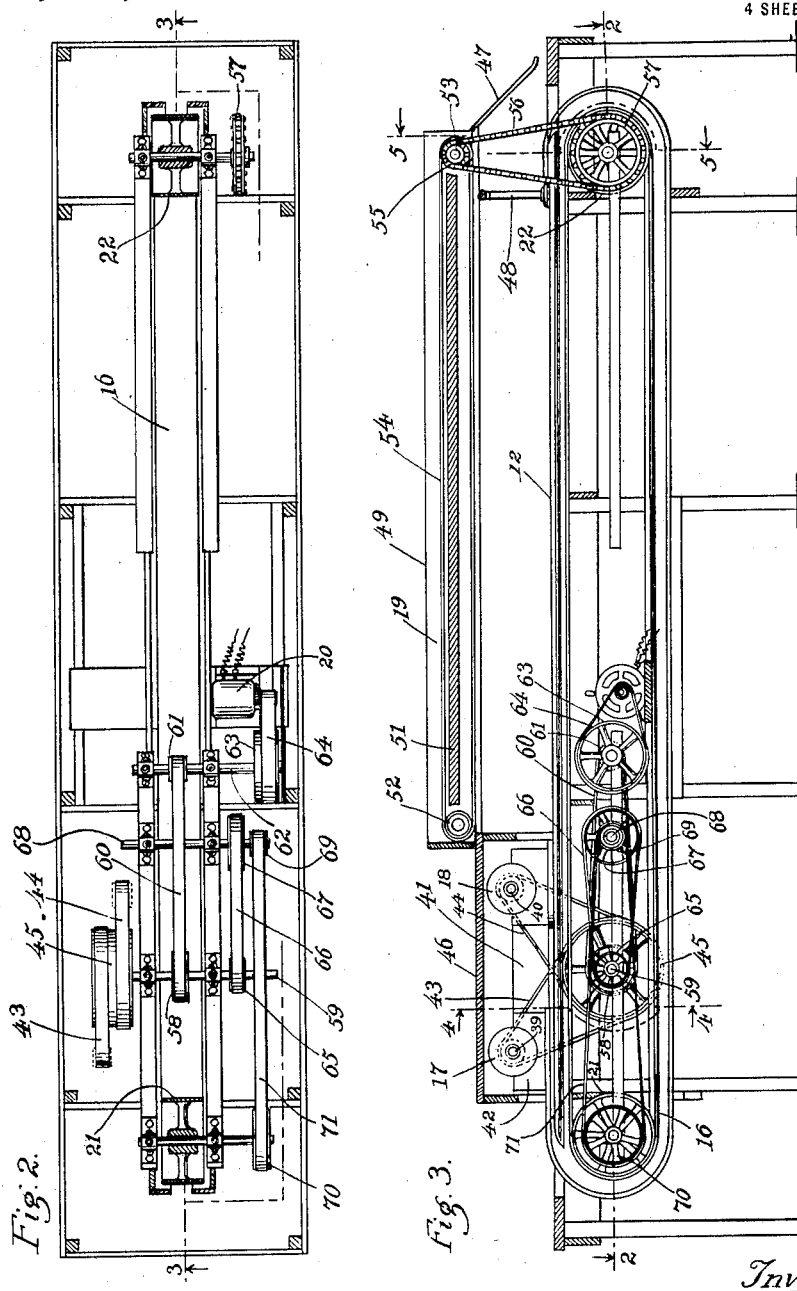

R. C. McGEE.
CAKE CUTTING MACHINE.
APPLICATION FILED JAN. 16, 1918.

1,357,241.

Patented Nov. 2, 1920.
4 SHEETS—SHEET 3.

Witnesses:
E. J. Geske
H. Thornton Bogert

Inventor:
Robert C. McGee
By Walter F. Murray
Attorney.

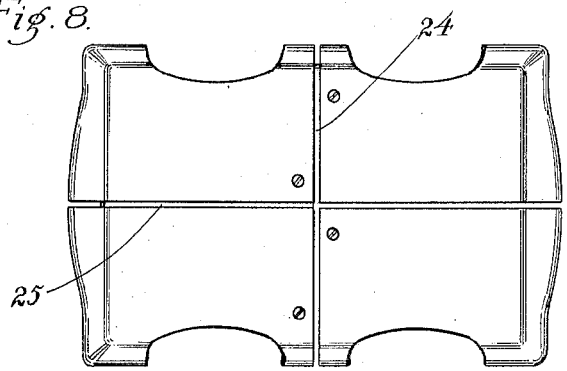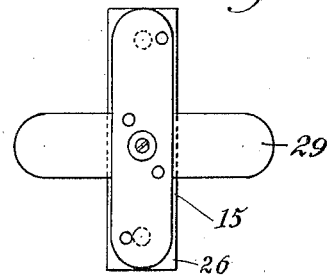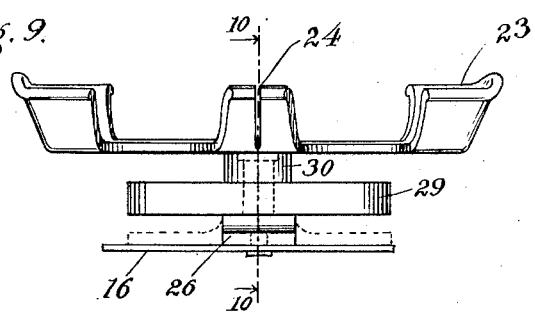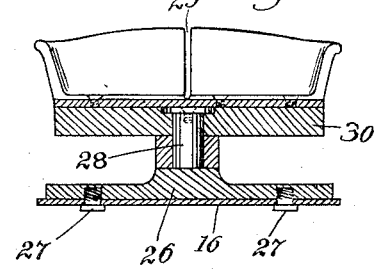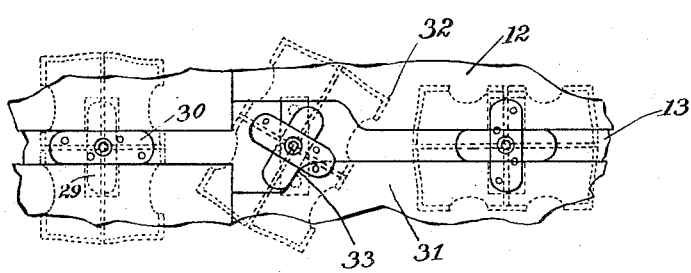

UNITED STATES PATENT OFFICE.

ROBERT C. McGEE, OF CINCINNATI, OHIO.

CAKE-CUTTING MACHINE.

1,357,241.  Specification of Letters Patent.  Patented Nov. 2, 1920.

Application filed January 16, 1918. Serial No. 212,130.

*To all whom it may concern:*

Be it known that I, ROBERT C. McGEE, a citizen of the United States of America, and resident of Cincinnati, in the county of Hamilton and State of Ohio, have invented a new and useful Improvement in Cake-Cutting Machines, of which the following is a specification.

An object of my invention is to produce a cake cutting machine adapted automatically to cut cake into pieces of uniform size, and simultaneously to provide for its wrapping and removal from the machine after having been wrapped.

This and other objects are attained in the machine described in the following specification and illustrated in the accompanying drawings, in which:

Fig. 2 is a plan view of the machine illustrated in Fig. 1, the table and parts above it being removed and other parts being shown in section on substantially the line 2—2 of Fig. 3.

Fig. 3 is a longitudinal sectional elevation of my improved machine taken on line 3—3 of Fig. 2.

Fig. 7 is a fragmental plan view of a portion of my machine and illustrating a detail thereof.

Fig. 8 is a plan view of a cake receiver embodying a detail of my invention.

Fig. 9 is a side elevation of the cake receiver disclosed in Fig. 8.

Fig. 10 is a transverse sectional view of a cake receiver and mounting means, taken on line 10—10 of Fig. 9.

Fig. 11 is a plan view of a cake receiver mounting means.

Figure 1:
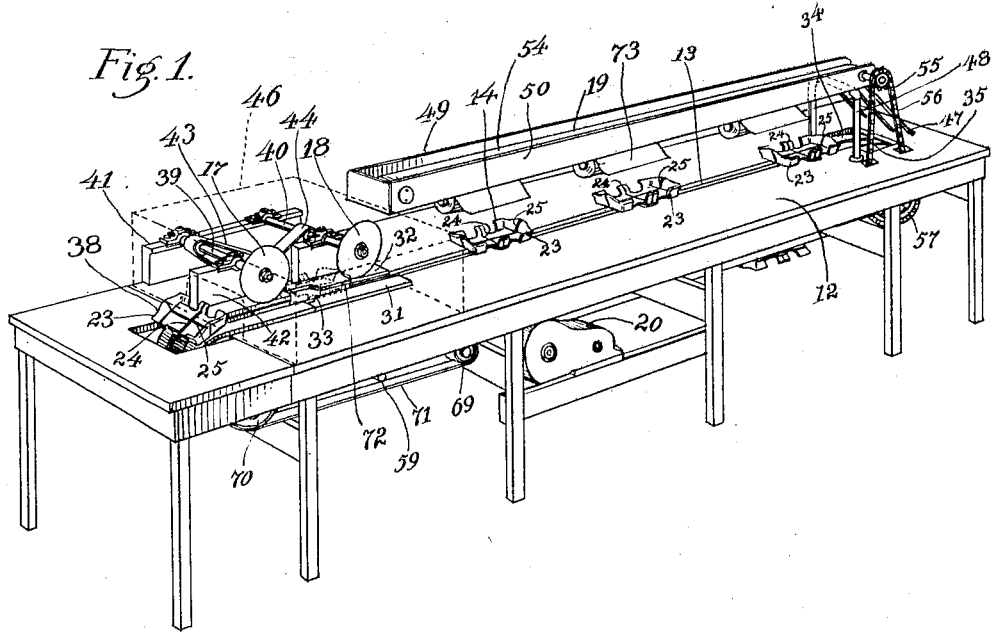
Figure 1 is a perspective view of the machine embodying my invention, parts being removed for convenience of illustration.
Figure 6:
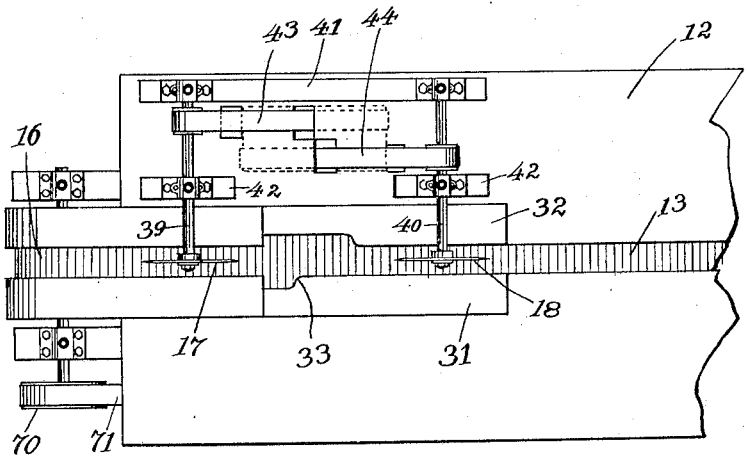
Fig. 6 is a fragmental plan view of one end of my improved machine, parts being removed for convenience of illustration.
Figure 4:
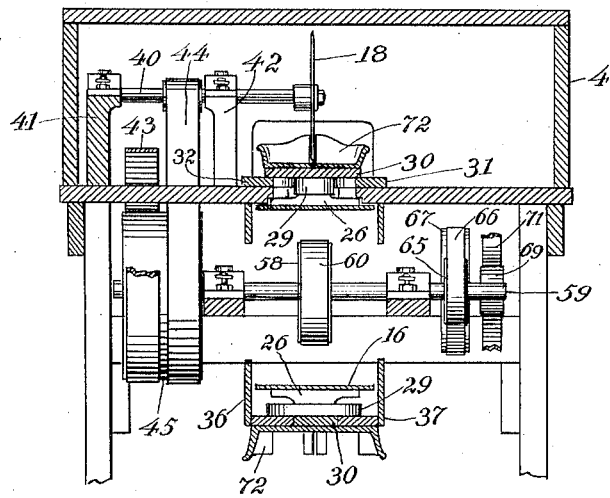
Fig. 4 is a fragmental transverse sectional elevation of my improved machine taken on the line 4—4 of Fig. 3.
Figure 5:
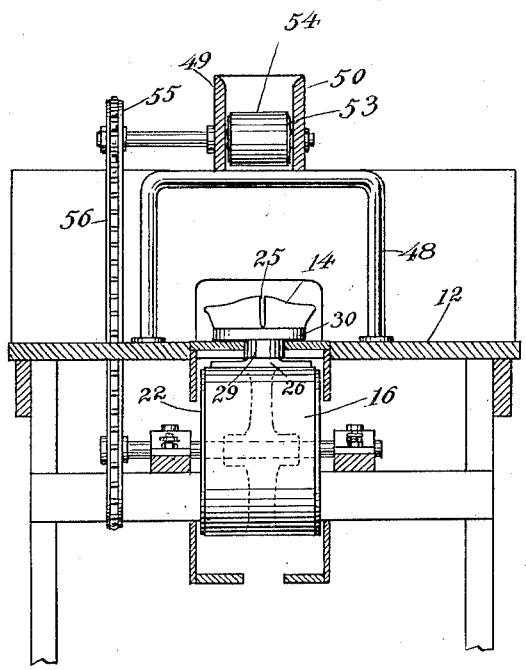
Fig. 5 is a fragmental transverse sectional elevation of my improved machine taken on the line 5—5 of Fig. 3.

The machine embodying my invention consists of a table 12 having a slot 13 therein and above which a series of cake receivers 14 are adapted to be moved by a series of receiver mounting means 15 secured to a conveyer belt 16 operating beneath the table, a pair of cake cutters 17 and 18, a conveyer 19 for wrapped cake, and a source of power 20, Located beneath the table are shafts carrying pulleys 21 and 22 over which the conveyer belt 16 travels. Upon the belt the series of cake receiver mounting means 15 are secured at equally spaced intervals and in position to project through slot 13, the receivers 14 being secured to the mounting means above the table. Each cake receiver has a rim 23 within which the cake to be cut is placed. Transversely and longitudinally of the receiver respective slots 24 and 25 are provided for the passage of the respective revolubly mounted knives 17 and 18, the receivers being rotatably mounted by means of the mounting means 15 which will now be described. Each mounting means consists of a plate 26 which is secured to the conveyer belt 16 by rivets 27 or other suitable fastening, a lug extending from the plate, from which projects a pivot pin 28 upon which a double armed lever 29 is pivotally mounted. Secured to lever 29 is the receiver-carrying bar 30 which pivots upon pin 28 with lever 29. Upon the surface of table 12 and at a point between the revolving knives 17 and 18, I have provided guides 31 and 32 adapted to cause one of the arms of each lever 29 to engage a shoulder 33 formed on guide 31 and thereby swing each receiver upon its pivot and bring the opposite knife slot into position to be engaged by the second knife 18, the opposite guide 32 acting to guide the lever between guides 31 and 32 after it has been swung by shoulder 33. After the receivers are passed over the table in the longitudinal positions shown in Fig. 1, they are brought to an inverted position beneath the table after-having had their mounting means passed between guides 34 and 35 as well as guides 36 and 37 beneath the belt 16. As each receiver in its return reaches a point near the pulley 21, I have provided a similar receiver turning mechanism to that shown in Fig. 7, adapted to again place the receivers in the position shown at 38 in Fig. 1. This second turning mechanism is located beneath the table and is not shown in the drawings, being similar in all respects to the mechanism disclosed in Fig. 7.

Knives 17 and 18 are disks having sharp edges and are mounted upon mandrels 39 and 40 rotatively mounted in bearings 41 and 42 upon the table top. The mandrels are driven by belts 43 and 44 which pass over a pulley 45 located beneath the table. Covering the knives is a casing 46 which protects the operatives and simultaneously serves as a support for one end of conveyer 19 which is supported at the opposite or delivery end of the machine by an arched support 48, the feet of which rest upon and are secured to the table upon each side of the receivers. Conveyer 19 consists of a casing having sides 49 and 50 as well as a bottom 51, with pulleys 52 and 53 rotatively mounted in the sides at the ends thereof, and a conveyer belt 54 mounted upon the pulleys and passing over the bottom 51. A sprocket 55 is provided for driving the conveyer through a chain 56 which passes over it and a sprocket 57 secured to and driven from the shaft which carries pulley 22 of the cake receiver conveyer.

In the mechanism employed for driving the knives and the two conveyers from the motor 20 I have provided a pulley 58 secured to shaft 59 which carries pulley 45, a belt 60 which passes over pulley 58 and a pulley 61 mounted upon a shaft 62 which also carries a pulley 63 which is operatively connected with the motor by a belt 64. Secured to shaft 59 is a pulley 65 which is driven by a belt 66 from a pulley 67 upon a countershaft 68. This shaft in turn conveys power to pulley 21 of the cake receiver conveyer mechanism through a pulley 69 upon shaft 68, a pulley 70 upon the shaft carrying conveyer pulley 21, and a belt 71 passing over pulleys 69 and 70.

In using my improved machine the cakes to be cut are placed in the receivers as they present themselves above the table top in the position shown at 38 in Fig. 1. The receivers are then passed beneath circular knife 17 which passes through transverse slot 24 of each receiver. The receivers are then rotated by engagement of levers 29 of their mounting means with shoulder 33 of guide 31, for the purpose of presenting slot 25 to knife 18. Thus each cake is cut twice and in four equal parts. As the receivers containing the cut cakes are moved over the table, the portions of the cakes are removed and wrapped on each side of the table, wrapping paper 73 being provided beneath conveyer 19 for this purpose. When the cakes are wrapped they are placed upon conveyer belt 54 and delivered therefrom onto ways 47 down which they slide into position for packing.

Having thus described my invention, what I claim is:

A cake cutting machine comprising a table having a longitudinal slot with an inwardly projecting shoulder, a conveyer beneath the slot, receivers having longitudinal and transverse slots and mounted rotatively upon the conveyer and having arms adapted to contact with the shoulder to impart rotation to the receivers, and knives with longitudinally disposed cutting blades mounted above the table and upon each side of the shoulder.

In testimony whereof, I have hereunto subscribed my name this 9th day of January, 1918.

ROBERT C. McGEE.

Witnesses:
 WALTER F. MURRAY,
 W. THORNTON BOGERT.